UNITED STATES PATENT OFFICE.

HARRY W. BRESLER, OF CHARLOTTENBURG, GERMANY, ASSIGNOR, BY MESNE ASSIGNMENTS, TO GENERAL ELECTRIC COMPANY, A CORPORATION OF NEW YORK.

PROCESS OF DRYING CEMENT CLAMPS FOR FILAMENTS OF ELECTRIC LAMPS.

1,024,923.  Specification of Letters Patent.  Patented Apr. 30, 1912.

No Drawing.   Application filed May 11, 1909.   Serial No. 495,261.

*To all whom it may concern:*

Be it known that I, HARRY W. BRESLER, a citizen of the German Empire, residing at Charlottenburg, Germany, have invented certain new and useful Improvements in Processes of Drying Cement Clamps for Filaments of Electric Lamps, of which the following is a specification.

My invention relates to incandescent electric lamps and comprises an improved process of treating the clamps of the filaments for such lamps to drive out the moisture therefrom.

As is well known, the filaments of many incandescent electric lamps are fastened to their leading-in wires or holders by means of cement. This cement must be dried, baked, annealed or otherwise treated to completely drive out all the moisture contained in the cement forming these clamps, before the filament is inserted in the lamp bulb. Otherwise the moisture in the cement will be given off during the lamp exhausting operation and the same delayed and complicated thereby. This is especially true of metallic filaments such as tungsten filaments. Heretofore, this baking or annealing has been done by applying the heat of a small jet of combustible gas, burning in the air, or by the heat of an electric current passed through the filament placed in a reducing atmosphere. Both of these old processes have their disadvantages. The electric treatment is expensive, especially as the work is usually done in an atmosphere of hydrogen. In the other process, the treatment of the clamps with an ordinary gas jet, the delicate metal filament is apt to become heated and oxidized in the air. I have discovered that all of these difficulties can be avoided and the baking, drying or annealing carried on to great advantage by simply reversing the usual conditions of heating by a gas jet in an oxidizing atmosphere, and placing the filament and clamps in a reducing atmosphere of combustible gas such as hydrogen, or ordinary illuminating gas, and then introducing a jet of air or oxygen or oxidizing gases and igniting the mixture of combustible atmosphere and oxygen or air at the point where said jet is produced. The jet of flame so obtained is necessarily a reducing one on account of the excess of reducing gases present and the small supply of oxygen fed through the burner, which oxygen is consumed completely in the flame as soon as discharged from the end of the burner or tube by which it is introduced. The heat of the flame is intense and highly localized so that it is particularly effective in heating a small object like the knot of cement forming a filament clamp, and no possible oxidation of the filament can result, no matter how much it is heated, as it is entirely immersed in a reducing atmosphere.

In all cases, of course, it is the oxygen introduced which supports combustion whether it enters in the form of pure oxygen or in the diluted form of ordinary air or other oxidizing mixture.

Having, therefore, described my invention, I claim:

1. The process of heating cement clamps for lamp filaments which comprises immersing the filament and clamps in a reducing atmosphere, discharging a jet of oxidizing gas into said atmosphere adjacent to said clamps, and igniting the localized combustible mixture so formed and maintained at the point of delivery of oxygen.

2. The method of heating the joint between a filament and its holder which consists in bringing the joint into proximity to a jet of oxidizing gas burning in a reducing atmosphere in which the parts are immersed and thus localizing the heating effect at the joint and keeping the parts wholly under reducing conditions.

3. The method of heating a portion of an object while protecting the remainder from chemical attack which consists in immersing the object in an atmosphere inert with respect to said object and causing combustion between gas from said atmosphere and a gaseous jet conducted into said atmosphere in proximity to the portion of the object to be heated.

4. The method of heating a portion of an object while protecting the remainder from chemical attack which consists in immersing the object in an atmosphere inert with respect to said object and burning a gaseous jet in said atmosphere in proximity to the portion of the object to be heated.

In witness whereof I have hereunto set my hand this twenty-sixth day of April 1909, in the presence of two subscribing witnesses.

HARRY W. BRESLER.

Witnesses:
HENRY HASPER,
WOLDEMAR HAUPT.